United States Patent
Moreau-Gobard et al.

(10) Patent No.: US 7,567,696 B2
(45) Date of Patent: Jul. 28, 2009

(54) SYSTEM AND METHOD FOR DETECTING THE AORTIC VALVE USING A MODEL-BASED SEGMENTATION TECHNIQUE

(75) Inventors: Romain Moreau-Gobard, Princeton, NJ (US); Nicolas Tisserand, Paris (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 827 days.

(21) Appl. No.: 11/065,731

(22) Filed: Feb. 24, 2005

(65) Prior Publication Data
US 2005/0281447 A1 Dec. 22, 2005

Related U.S. Application Data

(60) Provisional application No. 60/549,458, filed on Mar. 2, 2004.

(51) Int. Cl.
*G06K 9/00* (2006.01)
(52) U.S. Cl. ..................................... 382/131
(58) Field of Classification Search ................. 382/131
See application file for complete search history.

(56) References Cited

U.S. PATENT DOCUMENTS 6,937,776 B2 * 8/2005 Li et al. ................ 382/260
7,031,504 B1 * 4/2006 Argiro et al. ............. 382/131

OTHER PUBLICATIONS

Stephen Aylward, Stephen Pizer, David Eberly, Elizabeth Bullitt, "Intensity Ridge and Widths for Tubular Object Segmentation and Description," Mathematical Methods in Biomedical Image Analysis, 1996 Workshop on Mathematical Methods in Biomedical Image Analysis (MMBIA '96), 1996.*
Constantinidis, A.S.; Fairhurst, M.C.; Deravi, F.; Hanson, M.; Wells, C.P.; Chapman-Jones, C., "Evaluating classification strategies for detection of circumscribed masses in digital mammograms," Image Processing And Its Applications, 1999. Seventh International Conference on (Conf. Publ. No. 465), vol. 1, No., pp. 435-439 vol. 1, Jul. 1999.*

(Continued)

*Primary Examiner*—Bhavesh M Mehta
*Assistant Examiner*—Hadi Akhavannik
(74) *Attorney, Agent, or Firm*—Donald B. Paschburg; F. Chau & Associates, LLC

(57) ABSTRACT

A system and method for detecting the aortic valve is provided. The method comprises: (a) casting rays on a slice of a computed tomography (CT) dataset of an aorta; (b) computing a Gaussian model for voxels on the slice, wherein the Gaussian model produces a threshold; (c) growing a circle from a point within the aorta until control points of the circle reach the threshold; (d) computing a repulsion vector for each control point reaching the threshold; (e) repositioning the circle according to an average of the repulsion vectors, wherein if the circle is within the aorta, repeating steps (c-e) until the circle is not within the aorta; (f) calculating a statistical value for the circle; (g) projecting a copy of the circle onto an adjacent slice; (h) reducing the radius of the copy of the circle; and (i) repeating steps (c-h) on remaining CT slices until the aortic valve is detected.

18 Claims, 6 Drawing Sheets

OTHER PUBLICATIONS

Shechter, G.; Devernay, F.; Coste-Maniere, E.; Quyyumi, A.; McVeigh, E.R., "Three-dimensional motion tracking of coronary arteries in biplane cineangiograms," Medical Imaging, IEEE Transactions on , vol. 22, No. 4, pp. 493-503, Apr. 2003.*

Stanley III et al. Quantitative Analysis of Transesophageal Echocardiograms for the Intraoperative Setting: Clinical Need and Initial Experience.*

Image feature analysis and computer-aided diagnosis in digital radiography. Automated detection of nodules in peripheral lung fields Maryellen Lissak Giger, Kunio Doi, and Heber MacMahon, Med. Phys. 15, 158 (1988).*

P. Croisille, M. Souto, M. Cova, S. Wood, Y. Afework, J. E. Kuhlman, and E. A. Zerhouni, "Pulmonary nodules: Improved detection with vascular segmentation and extraction with spiral CT," Radiology 197, 397-401 (1995).*

Automatic detection of lung nodules from multislice low-dose CT images Li Fan, Carol L. Novak, JianZhong Qian, Gerhard Kohl, and David Naidich, Proc. SPIE 4322, 1828 (2001).*

Rueckert 0 et al: "Automatic Tracking of the Aorta in Cardiovascular MR Images Using Deformable Models" IEEE Transactions on Medical Imaging, IEEE Service Center, Piscataway, NJ, US, vol. 16, No. 5, Oct. 1, 1997, pp. 581-590, XP000722552 ISSN: 0278-0062 abstract.

Xu N et al: "Automatic lung nodule segmentation using dynamic programming and EM-based classification" Proceedings of the SPIE, SPIE, Bellingham, VA, US, vol. 4684, 2002, pp. 666-676, XP002323847 ISSN: 0277-786X abstract section 3.3. "Initialization and circle fitting" section 3.4. "Pre-processing using EM based classification".

G. Vosselman and R.M. Haralick: "Performance Analysis of Line and Circle Fitting in Digital Images" Proc. Workshop on Performance Characteristics of Vision Algorithms, Apr. 1996, XP002365722 abstract section 2.2: "Fitting a circle to points" Bosnjak A et al: 3D segmentation of the left ventricle in echocardiographic images using deformable m'odel based on the geometric evolution shapes.

Computers in Cardiology 2000 Cambridge, MA, USA Sep. 24-27, 2000, Piscataway, NJ, USA,IEEE, US, Sep. 24, 2000, pp. 111-114, XP010528509 ISBN: 0-7803-6557-7 abstract.

Dobrzeniecki A B et al: "Integrated and 1-20 Intuitive Segmentation of Volumetric Data: the Segmentview System and the Kooshball Algorithm" Proceedings of the International Conference onimage Processing. (ICIP). Washington, Oct. 23-26, 1995, Los Alamitos, IEEE Comp. Soc. Press, US, vol. vol. 3, Oct. 23, 1995, pp. 540-543, XP000623203 ISBN: 0-7803-3122-2 abstract.

* cited by examiner

SYSTEM AND METHOD FOR DETECTING THE AORTIC VALVE USING A MODEL-BASED SEGMENTATION TECHNIQUE

CROSS-REFERENCE TO RELATED APPLICATION

This application claims the benefit of U.S. Provisional Application No. 60/549,458, filed Mar. 2, 2004, the disclosure of which is herein incorporated by reference.

BACKGROUND OF THE INVENTION

1. Technical Field

The present invention relates to image segmentation, and more particularly, to image segmentation performed on multi-slice computed tomography (CT) angiography datasets.

2. Discussion of the Related Art

Cardiovascular disease, principally heart disease and stroke, is Western society's leading killer for both men and women. For example, almost one million Americans die of cardiovascular disease each year, which adds up to more than forty percent of all deaths. Moreover, heart disease does not just kill the elderly, it is the leading cause of death for all Americans age thirty-five and older. Although recent initiatives to encourage healthier lifestyles and increase early detection can prevent cardiovascular disease for those who are healthy and improve the health of people who have experienced this disease, proper diagnosis of cardiovascular disease is imperative for those afflicted.

Cardiovascular disease is typically diagnosed by a doctor who reviews a patient's medical history, health behaviors, family history, and other risk factors. If the patient has symptoms associated with, for example, heart disease, the doctor may perform a physical examination of the patient's lungs, heart and all of the blood vessels near and around the heart. Once it is determined that the patient has or is at risk of heart disease, an electrocardiogram, chest x-ray or echocardiogram is performed to determine the extent of the disease.

Although these techniques have been used for many years, they only provide a doctor with limited amounts of information. For example, x-ray and echocardiograms produce images in two-dimensions (2D) rather than in three-dimensions (3D) and the electrocardiogram records the electrical activity of the heart. Recently, however, computed tomography (CT), which is capable of producing images in 3D and four-dimensions (4D), has been used to diagnose cardiovascular disease. For example, a CT angiography may be performed to identify aneurysms in the aorta or in other major blood vessels.

A CT angiography is an examination that uses x-rays to visualize blood flow in arterial vessels throughout the body, from arteries serving the brain to those bringing blood to the lungs, kidneys, arm and legs. CT combines the use of x-rays with computerized analysis of the x-ray images. For example, beams of x-rays are passed from a rotating device through the area of interest in the patient's body from several different angles to create cross-sectional images, which are then assembled by a computer into a 3D picture of the area being studied.

In order to obtain measurements of cardiac parameters such as wall thickness of the coronary artery and ventricular volumes, segmentation of the CT images is required. For example, in order to determine the position of the aortic valve in the heart, a region growing segmentation technique in the left ventricle is performed. However, when performing a region growing in the left ventricle, the segmentation will leak through the aortic valve into other parts of the aorta. This will cause additional portions of the aorta to be segmented thus reducing the quality of the image. Although such leakage may be constrained by drawing a region around the aortic valve to restrict the segmentation algorithm from entering other parts of the aorta, this requires user interaction.

Accordingly, there is a need for an image segmentation technique that prevents leakage and that requires minimal to none user interaction thus enabling a quicker and more accurate diagnosis of cardiovascular disease.

SUMMARY OF THE INVENTION

The present invention overcomes the foregoing and other problems encountered in the known teachings by providing a system and method for detecting the aortic valve using a model-based segmentation technique.

In one embodiment of the present invention, a method for detecting an aortic valve, comprises: (a) casting a plurality of rays from a seed point within a slice of a computed tomography (CT) dataset of an aorta; (b) computing a Gaussian model for voxels in the slice, wherein the Gaussian model produces a threshold; (c) growing a circle on the slice from a point within the aorta until control points of the circle reach the threshold; (d) computing a repulsion vector for each control point reaching the threshold; and (e) repositioning the circle according to an average of the repulsion vectors, wherein if the circle is repositioned within the aorta, repeating steps (c-e) until the circle is not within the aorta.

The method further comprises: (f) calculating a statistical value for the circle; (g) projecting a copy of the circle onto an adjacent slice of the CT dataset; (h) reducing the radius of the copy of the circle; and (i) repeating steps (c-h) on remaining slices of the CT dataset until the aortic valve is detected. The aortic valve is detected by a decrease in the radius of the copy of the circle. The method further comprises: (j) segmenting the aorta using one of a region growing technique and an intensity-based segmentation algorithm constrained by the location of the aortic valve.

The radius of the copy of the circle is reduced by fifty percent. The seed point is selected by a user clicking on a portion of the slice. The length of each of the plurality of rays is defined by an estimated aorta radius. The CT dataset is acquired by one of a CT and helical CT imaging technique.

In another embodiment of the present invention, a system for detecting an aortic valve, comprises: a memory device for storing a program; a processor in communication with the memory device, the processor operative with the program to: (a) cast a plurality of rays from a seed point within a slice of a CT dataset of an aorta; (b) compute a Gaussian model for voxels in the slice, wherein the Gaussian model produces a threshold; (c) grow a circle on the slice from a central point within the aorta until control points of the circle reach the threshold; (d) compute a repulsion vector for each control point reaching the threshold; and (e) reposition the circle according to an average of the repulsion vectors, wherein if the circle is repositioned within the aorta, repeating steps (c-e) until the circle is not within the aorta.

The processor is further operative with the program code to: (f) calculate a statistical value for the circle; (g) project a copy of the circle onto an adjacent slice of the CT dataset; (h) reduce the radius of the copy of the circle; (i) repeat steps (c-h) on remaining slices of the CT dataset until the aortic valve is detected; and (j) segment the aorta using one of a region growing technique and an intensity-based segmentation algorithm constrained by the location of the aortic valve, wherein the aortic valve is detected by a decrease in the radius of the copy of the circle. The radius of the copy of the circle is reduced by fifty percent. The CT dataset is acquired by one of a CT and helical imaging device.

In yet another embodiment of the present invention, a method for detecting an aortic valve in a multi-slice CT dataset of an aorta, comprises: (a) casting rays from an initial point within a two-dimensional (2D) slice of the CT dataset; (b) computing a maximum median deviation for all voxels in the 2D slice, wherein the maximum median deviation produces a threshold value for determining which voxels of the 2D slice belong to the aorta; (c) growing a circle comprised of control points from a central point within the aorta and identifying where the control points cross the threshold value; (d) computing a repulsion vector for each point where the control points crossed the threshold value; and (e) repositioning the central point of the circle according to an average of the repulsion vectors to maximize an average radius of the circle, wherein if the circle is repositioned within the aorta, repeating steps (c-e) until the circle is not within the aorta.

The method further comprises: (f) calculating average voxel intensities for the circle; (g) projecting a copy of the circle onto an adjacent 2D slice of the CT dataset by translating the central point onto the adjacent slice; (h) reducing the radius of the copy of the circle by fifty percent; and (i) repeating steps (c-h) on remaining slices of the CT dataset until the aortic valve is detected. The aortic valve is detected by one of a decrease in the radius of the reduced copy of the circle and a decrease in the average voxel intensities of the circle. The method further comprises: (j) segmenting the aorta using one of a region growing technique and an intensity-based segmentation algorithm constrained by the location of the aortic valve. The initial point is selected by a user. The method further comprises: (k) analyzing variances of profile data given by each ray; and (l) selecting a cluster of minimum-variance rays from a portion of the 2D slice that belongs exclusively to the aorta prior to computing the maximum median deviation.

In another embodiment of the present invention, a method for detecting an aortic arch, comprises: (a) casting a plurality of rays from a seed point within a slice of a CT dataset of an aorta; (b) computing a Gaussian model for voxels in the slice, wherein the Gaussian model produces a threshold; (c) growing a circle on the slice from a point within the aorta until control points of the circle reach the threshold; (d) computing a repulsion vector for each control point reaching the threshold; (e) repositioning the circle according to an average of the repulsion vectors, wherein if the circle is repositioned within boundaries of the aorta, repeating steps (c-e) until the circle is not within the boundaries of the aorta; (f) calculating a statistical value for the circle; (g) projecting a copy of the circle onto an adjacent slice of the CT dataset; (h) reducing the radius of the copy of the circle; and (i) repeating steps (c-h) on remaining slices of the CT dataset until the aortic arch is detected, wherein the aortic arch is detected by one of a decrease in the radius of the copy of the circle and a decrease in the average voxel intensities of the circle.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
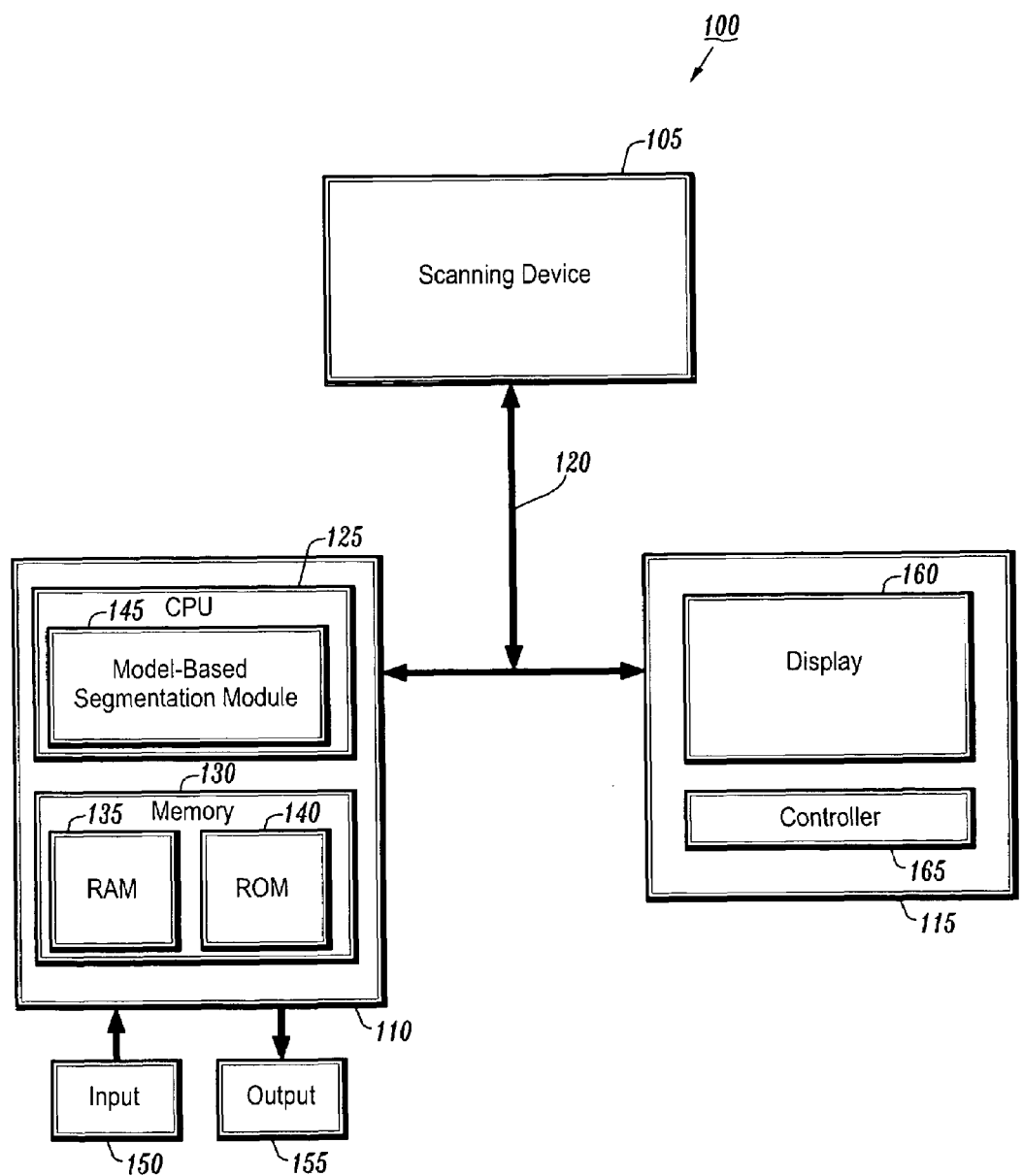
FIG. 1 is a block diagram of a system for detecting the aortic valve using a model-based segmentation technique according to an exemplary embodiment of the present invention.

FIG. 1 is a block diagram of a system 100 for detecting the aortic valve using a model-based segmentation technique according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a magnetic resonance imaging (MRI) device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device.

The PC 110, which may be a portable or laptop computer or a personal digital assistant (PDA), includes a central processing unit (CPU) 125 and a memory 130, which are connected to an input device 150 and an output device 155. The CPU 125 includes a model-based segmentation module 145 that includes one or more methods for detecting the aortic valve using a model-based segmentation technique.

The memory 130 includes a random access memory (RAM) 135 and a read only memory (ROM) 140. The memory 130 can also include a database, disk drive, tape drive or a combination thereof. The RAM 135 functions as a data memory that stores data used during execution of a program in the CPU 125 and is used as a work area. The ROM 140 functions as a program memory for storing a program executed in the CPU 125. The input device 150 is constituted by a keyboard or mouse and the output device 155 is constituted by a liquid crystal display (LCD), cathode ray tube (CRT) display or printer.

The operation of the system 100 is typically controlled from the operator's console 115, which includes a controller 165 such as a keyboard, and a display 160 such as a CRT display. The operator's console 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent the operator's console 115, using, for example, the input device 150 and output device 155 to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D renderings and visualizations of medical image data, and which executes on a general purpose or specific computer workstation. Moreover, the image rendering system may enable a user to navigate through a 3D image or a plurality of 2D image slices. The PC 110 may also include an image rendering system/tool/application for processing digital image data of an acquired image dataset to generate and display 2D and/or 3D images.

The model-based segmentation module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2A:
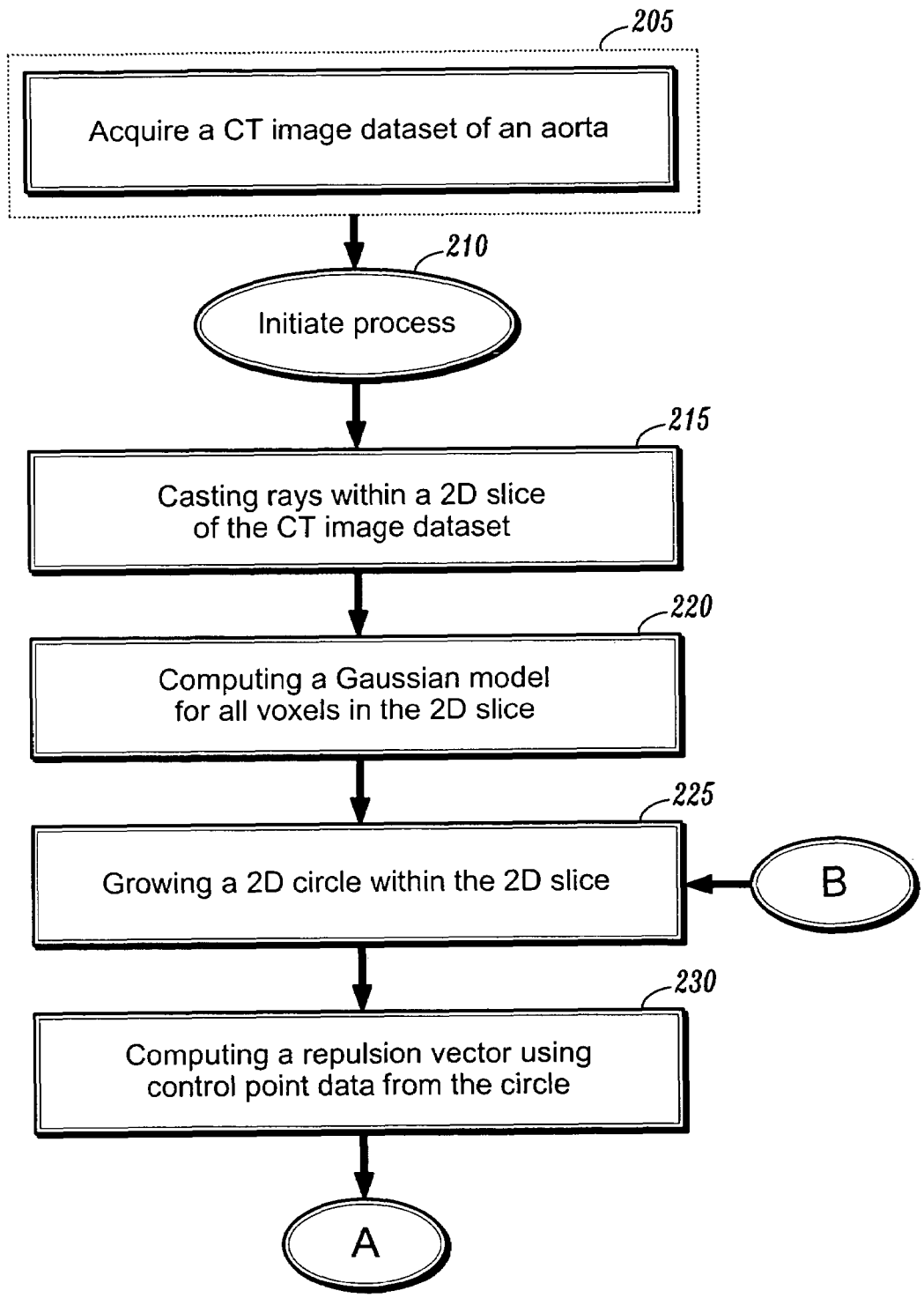
FIGS. 2A and 2B illustrate a flowchart of a method for detecting the aortic valve using a model-based segmentation technique according to an exemplary embodiment of the present invention.
Figure 2B:
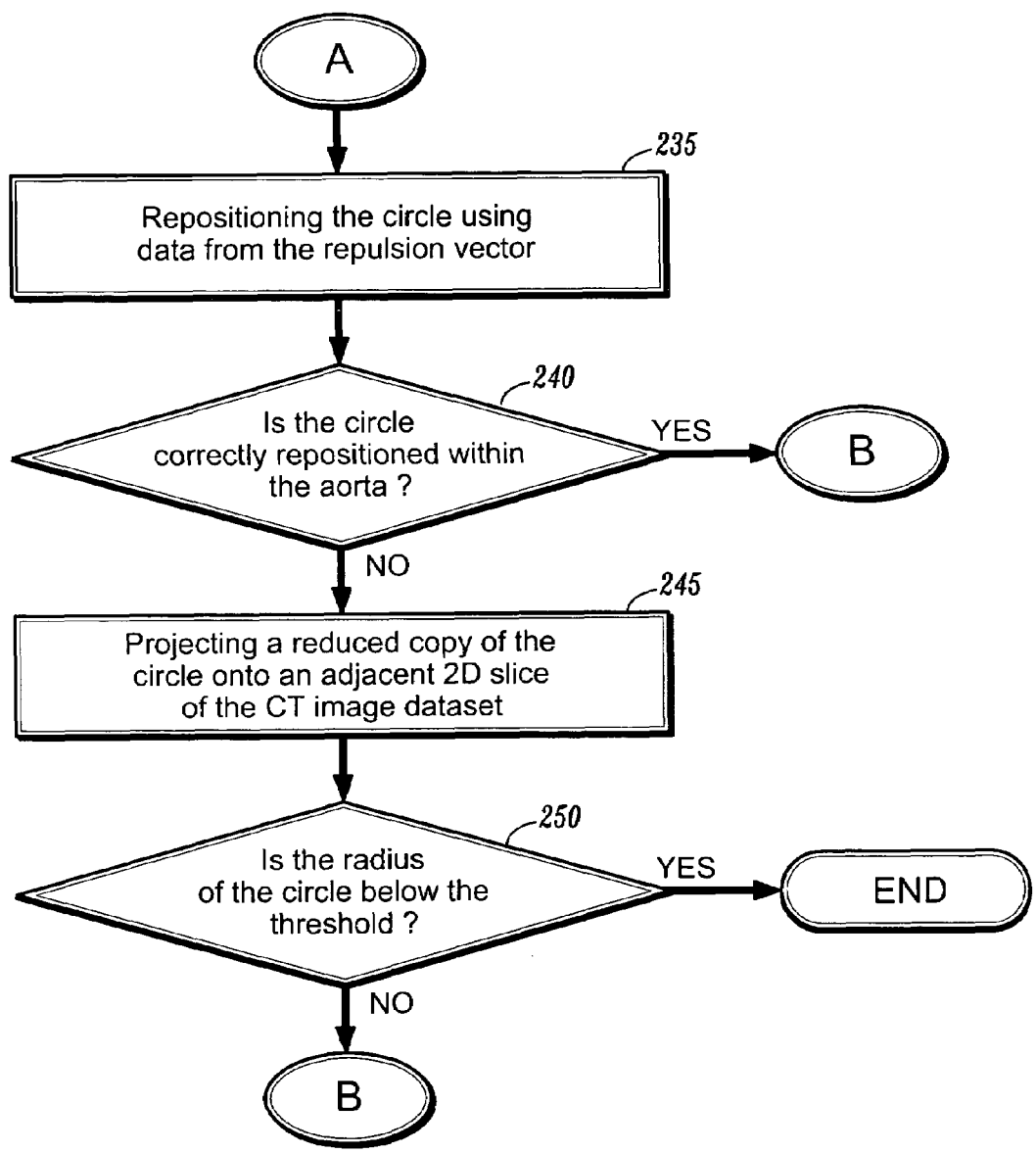

FIGS. 2A and 2B illustrate a flowchart of a method for detecting the aortic valve using a model-based segmentation technique according to an exemplary embodiment of the present invention. As shown in FIG. 2A, prior to performing the method for detecting the aortic valve, image data is acquired from a patient's heart (205). This is accomplished by using the scanning device 105, for example a CT scanner, operated by a user at the operator's console 115, to scan the heart thereby generating a series of 2D images associated therewith. The 2D images may then be converted or transformed into a 3D rendered image using the model-based segmentation module 145.

After the image data is acquired, the user located at the operator's console 115, selects a seed point in the image data in the aorta (210). The seed point may selected by the user clicking on a portion of a volume of the 3D image data or a portion of a 2D slice of the 3D image data as it is illustrated on the display 160. The selected seed point is typically located near the center of the aorta or in between the aortic arch and valve.

Once the seed point is selected, rays are cast from the seed point within the selected 2D slice (215). The rays are cast using a conventional raycasting technique and are typically limited to a length that is smaller than a smallest known aorta radius, which may be, for example, less than two centimeters. The goal of this step is to find a portion of the 2D slice that is exclusively within the aorta. This is done by analyzing the variances of profile data given by each ray and choosing a cluster of minimum-variance rays from a portion of the 2D slice that belongs exclusively to the aorta.

After the rays have been cast, a maximum deviation or a Gaussian model for all voxels in the 2D slice is computed (220). The Gaussian model may be computed, for example, by assuming that n number of rays are cast in step 215. Next, assume that n sets of samples are collected along the n number of rays where n variances of the n samples are computed. From this, a number of x rays having minimum variances are selected. The number of x rays are then merged into a single sample S and a variance V and the median M of S are computed. Thus, a final voxel intensity acceptance window or Gaussian model [imin, imax], may be determined using the following:

$imin = M - V*sigma$ $imax = M + V*sigma$ where sigma is a parameter also used to determine the Gaussian model. In particular, sigma is used to adjust the sensitivity of the Gaussian model. For example, if sigma is set low the acceptance window will be narrow and if sigma is set high the acceptance window will be wide. The computed Gaussian model may then be used in the following steps to determine which voxels of the 2D slice belong to the aorta.

Figure 3:
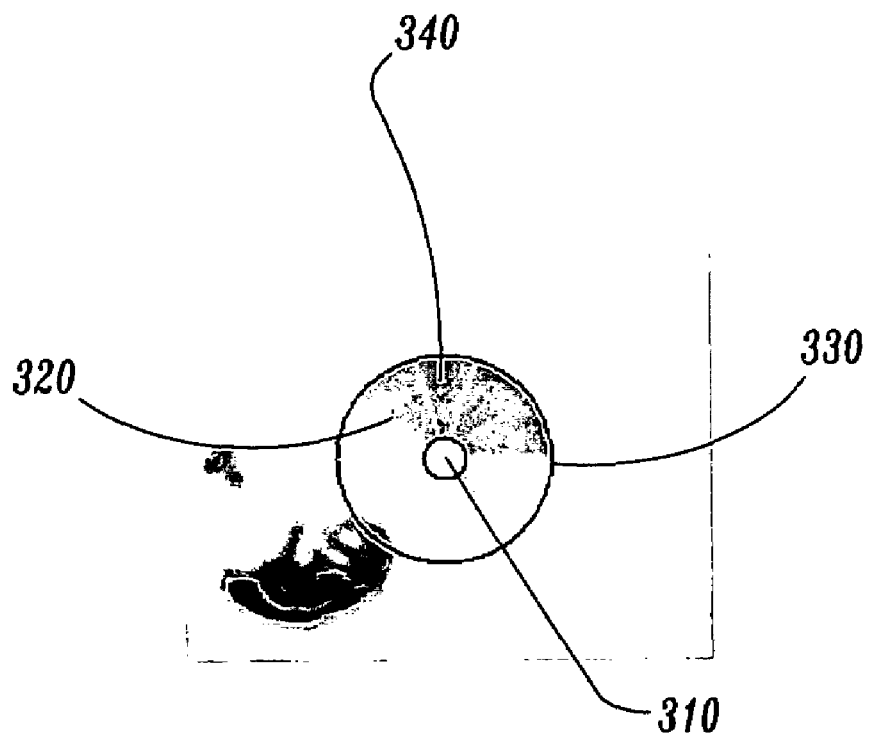
FIG. 3 illustrates a plurality of rays cast from a seed point constrained by a predetermined radius in an aorta in accordance with an exemplary embodiment of the present invention.

In steps 215 and 220, an initial gathering of statistical information associated with the 2D slice takes place. More specifically, the steps are used to detect a drop in the intensities of the voxels near the boundaries of the aorta. This gathering of statistical information is illustrated, for example, in FIG. 3. In particular, FIG. 3 illustrates a 2D slice of CT image data that includes a user selected seed point 310 with a plurality of rays 320 cast therefrom. The seed point 310 is surrounded by a circle 330 that is defined by a minimum expected aorta radius. By performing steps 215 and 220, a shaded area 340 within the circle 330 is determined as belonging to the aorta and this will be the area of the 2D slice to be further analyzed.

Subsequent to the computation of the Gaussian model for all voxels in the 2D slice, a circle is grown within an area of the 2D slice determined to belong to the aorta (225). In particular, the circle, which is comprised of a plurality of control points, is grown from an initial point within the aorta until one of the control points reaches a threshold. In other words, the circle is grown until it comes into contact with one of the colliding points determined by the threshold of the Gaussian model. As the circle comes into contact and crosses the colliding points, a set of repulsion vectors for each of the colliding points is computed (230).

The repulsion vectors are calculated, for example, by defining the circle as having n control points p1, p2 ... pn uniformly spaced around the circle. The control points p1, p2 ... pn have n associated angles a1, a2 ... an, each having n associated cosines x1, x2 ... xn and sins y1, y2 ... yn. When one of the control points p1, p2 ... pn exceeds the threshold, an escape or repulsion vector is computed as follows:

```
xv = 0
yv = 0
for i in [1 ... n]
{
    if pi is not within the threshold
    {
        xv = xv + xi
        yv = yv + yi
    }
}
normalize(xv, yv).
```

Using the computed repulsion vectors, the circle is repositioned (235). This is done to maximize the average radius of the circle. Assuming that c(x, y) is the current center of the circle and v (xv, yv) is the escape or repulsion vector, the circle may be re-centered according to the following procedure:

```
i = 0;
while (i < max_escape_iterations) and some control points do not fit
the vessel intensity model {
    x = x + xv * x_speed
    y = y + yv * y_speed
    ++i.
}
```

Next, it is determined if the circle is correctly repositioned within the aorta (240). The circle is correctly repositioned in the aorta if all the control points are on valid voxels. In other words, the circle is within the boundaries of the aorta. If the circle is correctly repositioned within the aorta, the method returns to step 225, another circle is grown and the process is repeated until the circle does not fit in the aorta. If the circle is not correctly positioned within the aorta, a reduced copy of the circle is projected onto an adjacent 2D slice of the CT image dataset (245). This occurs when all the voxels in the circle are less than max_escape_iterations. This may be accomplished by assuming that c (x, y, z) are the coordinates of the center of the circle and r is its radius. The circle model is initialized by adding or subtracting (depending on the direction of the image acquisition) the thickness of the 2D slice from the z coordinate of the circle, thus reducing the radius of the copy of the circle by, for example, 50%. It is then determined if the radius of the projected circle is below the threshold (250).

If the radius is below the threshold, statistical measurements associated with the circle will be used to determine the location of the aortic valve. The statistical measurements associated with the circle may be calculated average intensities of each circle or observed variations of the center point for each circle. It is to be understood that the statistical measurements associated with each circle on each 2D slice may be taken at, during or after any step or steps.

Figure 4:
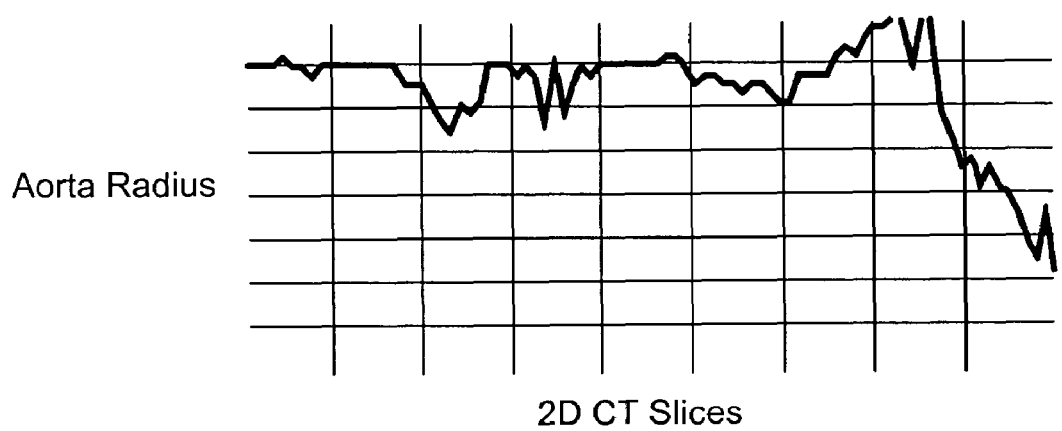
FIG. 4 is a graph illustrating a radius of the aorta as it decreases in computed tomography (CT) image slices as the CT image slices approach the aortic valve.

An example of a statistical measurement used to determine the location of the aortic valve is shown in FIG. 4. As shown in FIG. 4, when the reproduced circles near the aortic valve (at the right hand side of the graph), their radii will drop off precipitously. This occurs because as the aorta enters the left ventricle the radii of the reproduced circles that correspond to this area converge to a minimum. This observation can then be used to stop the method and deduce the location of the aortic valve.

Referring back to step 250, if the radius is not below the threshold, the method again returns to step 225 and the process is repeated until a circle having a radius below the threshold is found. This enables the location of the aortic valve to be known. Using the data associated with the location of the aortic valve, a segmentation may be performed on the aorta constrained by the location of the aortic valve. In other words, the aorta may be segmented and the segmentation will stop at the aortic valve. Thus, the segmentation will not leak into other regions of the aorta.

Figure 5A:
FIGS. 5A and 5B illustrate an axial view and a sagittal view, respectively, of an aorta segmented in accordance with an exemplary embodiment of the present invention.
Figure 5B:
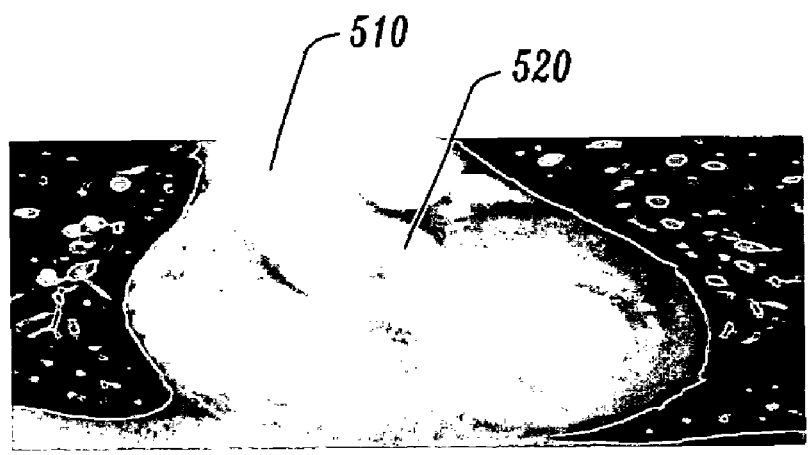

An example an aorta segmented in accordance with an exemplary embodiment of the present invention is shown in FIGS. 5A and 5B. In particular, FIG. 5A illustrates an axial view and FIG. 5B illustrates a sagittal view of an aorta 510 segmented in accordance with the present invention. As shown in FIG. 5B, the segmentation stops or is precluded from entering other parts of the aorta at the aortic valve 520.

Thus, in accordance with an exemplary embodiment of the present invention, the location of the aortic valve may be determined. This location may then be used as a constraint when segmenting the aorta, the coronary arteries or the left ventricle. Therefore, this technique provides a quick (e.g., about 0.7 seconds on a 1 GHz i686 machine for a 100 CT slice aorta) and relatively non-computationally intensive pre-segmentation process, which can be used in conjunction with other segmentation processes to detect plaques, aneurysms and abnormal configurations of the aorta, the coronary arteries or the left ventricle. Using the same techniques for locating the aorta valve, the location of the aortic arch may also be determined. This location may then be used, for example, to determine where the coronary arteries branch out from the aorta thus preventing a segmentation from leaking into the coronary arteries.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for detecting an aortic valve, comprising:
(a) casting a plurality of rays from a seed point within a slice of a computed tomography (CT) dataset of an aorta;
(b) computing a Gaussian model for voxels in the slice, wherein the Gaussian model produces a threshold;
(c) growing a circle on the slice from a point within the aorta until control points of the circle reach the threshold;
(d) computing a repulsion vector for each control point reaching the threshold;
(e) repositioning the circle according to an average of the repulsion vectors until the circle is not within the aorta;
(f) projecting a copy of the circle onto an adjacent slice of the CT dataset;
(g) reducing the radius of the copy of the circle and taking at least one statistical measurement of the copy if the radius is below the threshold;
repeating steps (c-g) on remaining slices of the CT dataset until the aortic valve is detected by using at least one of the statistical measurements;
segmenting the aorta constrained by the location of the aortic valve; and
displaying the segmented aorta.

2. The method of claim 1, wherein the aortic valve is detected by a decrease in the radius of the copy of at least one circle.

3. The method of claim 1, wherein the aorta is segmented using a region growing technique or an intensity-based segmentation algorithm constrained by the location of the aortic valve.

4. The method of claim 1, wherein in step (g) the radius of the copy of the circle is reduced by fifty percent.

5. The method of claim 1, wherein the seed point is selected by a user clicking on a portion of the slice.

6. The method of claim 1, wherein the length of each of the plurality of rays is defined by an estimated aorta radius.

7. The method of claim 1, wherein the CT dataset is acquired by a CT or helical CT imaging technique.

8. A system for detecting an aortic valve, comprising:
a memory device for storing a program;
a processor in communication with the memory device, the processor operative with the program to;
(a) cast a plurality of rays from a seed point within a slice of a computed tomography (CT) dataset of an aorta;
(b) compute a Gaussian model for voxels in the slice, wherein the Gaussian model produces a threshold;
(c) grow a circle on the slice from a central point within the aorta until control points of the circle reach the threshold;
(d) compute a repulsion vector for each control point reaching the threshold;
(e) reposition the circle according to an average of the repulsion vectors until the circle is not within the aorta;
(f) project a copy of the circle onto an adjacent slice of the CT dataset;
(g) reduce the radius of the copy of the circle and take at least one statistical measurement of the copy if the radius is below the threshold; and
repeat steps (c-g) on remaining slices of the CT dataset until the aortic valve is detected by using at least one of the statistical measurements.

9. The system of claim 8, wherein the processor is further operative with the program to:
segment the aorta using a region growing technique or an intensity-based segmentation algorithm constrained by the location of the aortic valve, wherein the aortic valve is detected by a decrease in the radius of the copy of at least one circle.

10. The system of claim 8, wherein in step (g) the radius of the copy of the circle is reduced by fifty percent.

11. The system of claim 8, wherein the CT dataset is acquired by a CT or helical CT imaging device.

12. A method for detecting an aortic arch, comprising:
(a) casting a plurality of rays from a seed point within a slice of a computed tomography (CT) dataset of an aorta;
(b) computing a Gaussian model for voxels in the slice, wherein the Gaussian model produces a threshold;
(c) growing a circle on the slice from a point within the aorta until control points of the circle reach the threshold;
(d) computing a repulsion vector for each control point reaching the threshold;
(e) repositioning the circle according to an average of the repulsion vectors until the circle is not within the boundaries of the aorta;
(f) projecting a copy of the circle onto an adjacent slice of the CT dataset;
(g) reducing the radius of the copy of the circle and taking at least one statistical measurement of the copy if the radius is below the threshold;
repeating steps (c-g) on remaining slices of the CT dataset until the aortic arch is detected by using at least one of the statistical measurements;
segmenting the aorta constrained by the location of the aortic arch; and
displaying the segmented aorta.

13. The method of claim 12, wherein the aortic arch is detected by a decrease in the radius of the copy of at least one circle or a decrease in the average voxel intensities of at least one circle.

14. A system for detecting an aortic arch, comprising:
a memory device for storing a program;
a processor in communication with the memory device, the processor operative with the program to:
(a) cast a plurality of rays from a seed point within a slice of a computed tomography (CT) dataset of an aorta;
(b) compute a Gaussian model for voxels in the slice, wherein the Gaussian model produces a threshold;
(c) grow a circle on the slice from a point within the aorta until control points of the circle reach the threshold;
(d) compute a repulsion vector for each control point reaching the threshold;
(e) reposition the circle according to an average of the repulsion vectors until the circle is not within the boundaries of the aorta;
(f) project a copy of the circle onto an adjacent slice of the CT dataset;
(g) reduce the radius of the copy of the circle and take at least one statistical measurement of the copy if the radius is below the threshold; and
repeat steps (c-g) on remaining slices of the CT dataset until the aortic arch is detected by using at least one of the statistical measurements.

15. The system of claim 14, wherein the aortic arch is detected by a decrease in the radius of the copy of at least one circle or a decrease in the average voxel intensities of at least one circle.

16. The system of claim 8, wherein the aortic valve is detected by a decrease in the radius of the copy of at least one circle.

17. The system of claim 8, wherein the seed point is selected by a user clicking on a portion of the slice.

18. The system of claim 8, wherein the length of each of the plurality of rays is defined by an estimated aorta radius.

* * * * *